United States Patent [19]
Wilcox

[11] Patent Number: 5,403,427
[45] Date of Patent: Apr. 4, 1995

[54] SEAL BAR

[75] Inventor: Karl M. Wilcox, Chesterfield County, Va.

[73] Assignee: Reynolds Metals Company, Richmond, Va.

[21] Appl. No.: 924,614

[22] Filed: Aug. 6, 1992

Related U.S. Application Data

[63] Continuation of Ser. No. 692,429, Apr. 29, 1991, abandoned.

[51] Int. Cl.⁶ .................... B65B 51/30; B65B 51/14
[52] U.S. Cl. .................... 156/359; 156/515; 156/530; 156/583.1; 53/373.7; 53/375.9
[58] Field of Search .............. 156/359, 515, 530, 580, 156/581, 583.1, 583.6, 583.8; 53/373.2, 373.4, 373.7, 375.8, 375.9; 100/93 P, 93 RP, 92

[56] References Cited

U.S. PATENT DOCUMENTS

| 2,589,756 | 3/1952 | Waters | 100/93 P |
|---|---|---|---|
| 2,707,985 | 5/1955 | Binnall | 156/515 |
| 3,015,601 | 1/1962 | Fener | 156/583.2 X |
| 3,054,441 | 9/1962 | Gex et al. | 156/515 |
| 3,494,816 | 2/1970 | Fener | 156/359 |
| 3,577,820 | 5/1971 | Silverstein | 156/515 X |
| 3,782,072 | 1/1974 | Sorensen et al. | 156/515 X |
| 3,822,164 | 7/1974 | Guido et al. | 156/359 X |
| 3,900,360 | 8/1975 | Leatherman | 156/272.4 |
| 3,940,305 | 2/1976 | Stenberg | 156/515 |
| 4,288,968 | 9/1981 | Seko et al. | 156/583.1 X |
| 4,743,333 | 5/1988 | Forthmann | 156/359 |
| 4,807,426 | 2/1989 | Smith | 156/583.1 X |
| 4,872,942 | 10/1989 | Sharps, Jr. et al. | 156/515 |
| 5,056,295 | 10/1991 | Williams | 156/530 X |

FOREIGN PATENT DOCUMENTS 1035031 7/1966 United Kingdom ............. 156/515

*Primary Examiner*—David A. Simmons
*Assistant Examiner*—J. Sells
*Attorney, Agent, or Firm*—Alan T. McDonald

[57] ABSTRACT

A seal bar for cutting and sealing plastic films about wrapped products comprises a laminated seal bar arrangement in which seal bar halves with a cutting knife, heating element and temperature sensor therebetween are adhesively secured together with a heat cured epoxy. The seal bar halves are preferably extruded members. A fixed temperature controller maintains the operating temperature of the seal bar below the melting temperature of the adhesive epoxy to prevent delamination from occurring.

22 Claims, 1 Drawing Sheet

SEAL BAR

This application is a continuation of application Ser. No. 07/692,429, filed Apr. 29, 1991, abandoned.

TECHNICAL FIELD

The present invention relates to seal bars used in the flexible packaging industry and, more particularly, to the construction of a seal bar in which the components therein are laminated together.

BACKGROUND ART

Seal bars are commonly used in the flexible packaging industry to cut and seal plastic films around articles such as food products. Known seal bars of which I am aware generally comprise a pair of seal bar halves which are machined from metal bar stock to a desired shape and then drilled and fastened together with screws. A cutting knife is mounted with screws between the halves. The knife edge projects from lengthwise edges of the halves which are sealing surfaces. A heating element clamped between the halves is connected to a power source to heat the knife and sealing surfaces.

In use, the seal bar which is pivotally mounted to a machine frame of a wrapping machine, descends into contact with a continuous ribbon of plastic film which has been wrapped around and extends between adjacent articles being packaged in a known manner. The action of heat and cutting severs the film between the packages while the heated sealing surfaces fuse the film together on either side of the cutting knife to seal the package along one or more edges.

Various disadvantages occur with the aforementioned seal bars. For example, machining the of the seal bar halves is relatively expensive and limits the halves and thereby the seal bar to conventional straight seal bar shapes. In addition, extremely close tolerances are required to ensure that the various components can be properly secured together with screws. The overall manufacture and assembly of the individual components is time consuming and labor extensive, thereby increasing costs.

It is accordingly one object of the present invention to simplify the manufacture and assembly of seal bars.

Another object to manufacture seal bar halves using manufacturing methods hitherto unknown in the art of seal bar assembly and which enables the seal bar halves and thereby the seal bar to be formed in unconventional shapes to suit the particular geometry of the products being wrapped.

Still another object is to eliminate the need for close tolerances in the manufacture and assembly of the various components forming the seal bar.

A further object is to assemble components of the seal bar together without screws.

SUMMARY OF THE INVENTION

A seal bar, in accordance with the present invention, comprises a pair of seal bar halves attached together along facing surfaces and a cutting knife mounted to extend between the surfaces and project from the seal bar halves. A pair of sealing surfaces are respectively formed on the seal bar halves to extend adjacent opposite sides of the cutting knife. A heating element is mounted between the seal bar facing surfaces for heating the cutting knife and sealing surfaces through the seal bar halves. Adhesive material is disposed between the facing surfaces for adhesively securing the halves and cutting knife and heating element together to form the seal bar.

In the preferred embodiment, the adhesive securing of the various aforesaid components enables the seal bar to be manufactured without screws and thereby eliminates the requirement of close tolerances.

The adhesive is preferably a heat cured epoxy having a melting temperature greater than the operating temperature of the seal bar. This temperature differential prevents delamination from occurring along the glue lines.

Preferably, a temperature sensor is mounted in the seal bar with the adhesive for sensing temperature of the heating element means. The temperature sensor is connected to a temperature controller which maintains the temperature of the seal bar at a fixed operating temperature which is below the melting temperature of the adhesive means. In the preferred embodiment, the temperature controller has a pre-set temperature value to prevent temperature adjustment by an operator of a packaging machine employing the seal bar.

In accordance with another feature of the invention, the seal bar halves are preferably extruded members. This eliminates the need for expensive machining of metal bar stock into the seal bar halves. The assembling method also enables the seal bars to be manipulated into specific shapes without machining. Such specific shapes, in plan view, encompass seal bars of circular configuration, U-shaped configuration, as well as seal bars including curvilinear portions adapted to suit the geometry of the particular product being packaged.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
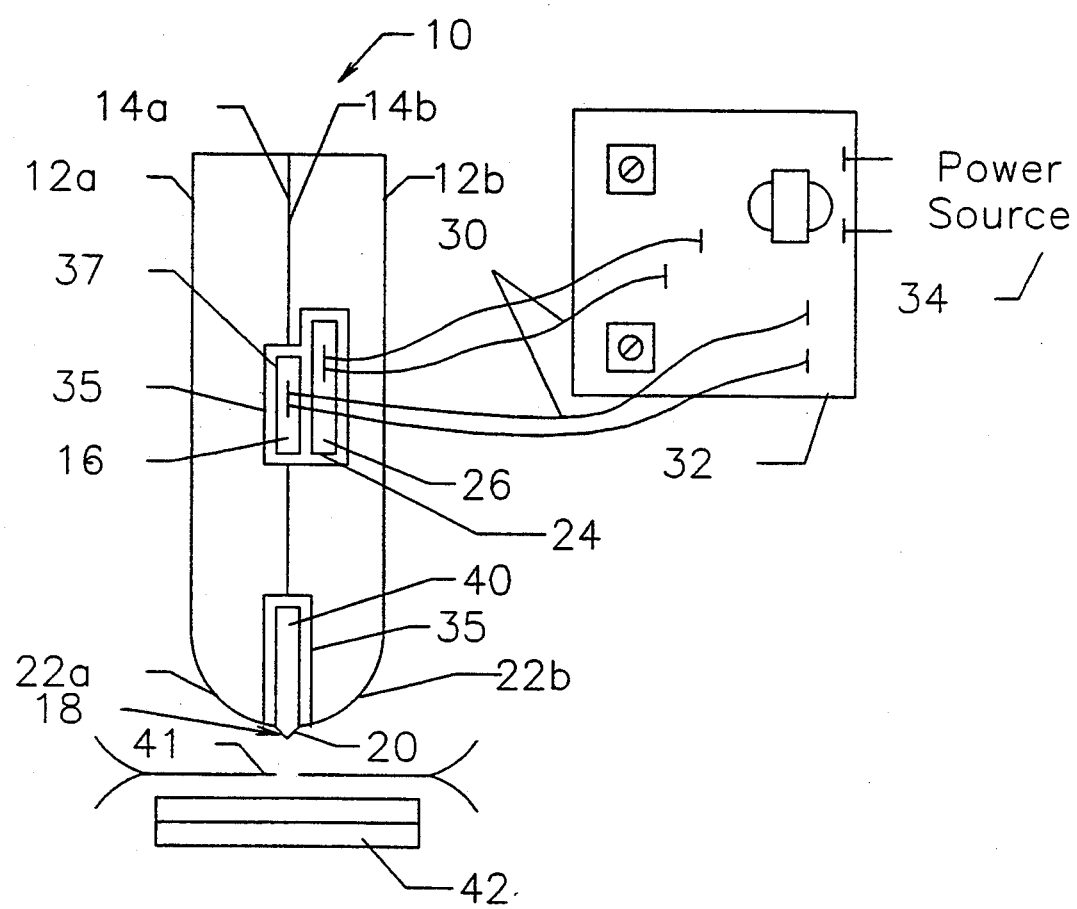
FIG. 1 is a cross-sectional view of a seal bar of the invention.

Referring to FIG. 1, seal bar 10 of the invention comprises a pair of seal bar halves 12a and 12b having joined interior facing surfaces 14a and 14b, respectively, between which are disposed a heating element 16 and a cutting knife 18 having a cutting edge 20 projecting downward below rounded bottom surfaces of the seal bar halves which define sealing surfaces 22a and 22b. A temperature sensor 24 is contained within a cavity 26 formed in the seal bar half 12b or may be incorporated into the heating element. The heating element 16 and temperature sensor 24 are connected with wires 30 to an external temperature controller 32 which is connected to a power source 34 (e.g., 115 V A.C.).

In accordance with a unique feature of this invention, the seal bar halves 12a,12b, heating element 16, cutting knife 18 and temperature sensor 24 are secured together with adhesive means such as a heat cured epoxy 35.

Seal bar halves 12a,12b are preferably made of a heat transfer material such as aluminum which is generally uniformly heated along its entire length with heating element 16. The heat emitted from element 16 is thermally transferred through the seal bar halves to heat the cutting knife edge 20 and the sealing surfaces 22a,22b. Heating element 16 is located in a rectangular cavity 37 extending substantially the full length of the seal bar 10. The cavity 37 is defined when the rectangular channels formed in each opposing face 14a,14b of the seal bar halves 12a,12b are brought together during assembly. Rectangular channels formed in the bottom of each opposing face 14a,14b define a slot 40 which is open to the bottom of the seal bar 10 and adapted to contain cutting knife 18.

Temperature sensor 24 is preferably a resistance time differential sensor (e.g., an RTD nickel iron sensor such as Part No. 539FAY72A manufactured by Minco, Incorporated, Minneapolis, Minn.), or can be a platinum wire RTD.

A preferred adhesive 35 is Novolac Epoxy Model Adhesive (available from Master Bond, Inc., Hackensack, N.J.) which is a temperature cured adhesive having a melting temperature of approximately 450° F. Since the normal operating temperature of seal bar 10 is not above 325° F., delamination or ungluing of the component parts advantageously does not occur during normal use of seal bar 10. The epoxy 35 is disposed between substantially all of the contact surfaces of the component parts, including the facing surfaces 14a,14b, and is a thermally conductive medium enabling heat from element 16 to be directly transferred into the body of the seal bar halves 14a,14b across the adhesive interface.

Each seal bar half 12a,12b is preferably formed using known extrusion methods and equipment which will now be obvious to one of ordinary skill in the art based upon a review of this specification. The feature of forming the seal bar halves 12a,12b as extruded members advantageously eliminates the need for conventional machining of the halves from metal bar stock and also allows the halves and thereby the overall seal bar 10 to be formed into various shapes prior to adhesively securing the components together. Such shapes, in plan view, include but are not limited to circular shapes, square shapes, oval shapes, heart shapes, etc.

Heat seal bar 10 of the invention is pivotally or otherwise conventionally secured to a known wrapping machine and is brought into a sealing position, using known manual or automatic means, whereupon the packaging material such as shrink film 41 is clamped between the sealing surfaces 22a,22b and a known flexible seal pad 42. Seal bar 10, through its sealing surfaces 22a,22b, fuses overlapping portions of the shrink film 41 together on either side of the cutting knife 20 which cuts and separates the film wrapped around different products.

Numerous advantages result from seal bar 10 of the present invention. For example, as set forth above, the feature of adhesively securing the aforesaid components together eliminates the need for screws to secure halves 12a,12b, thereby reducing costs and the need for close tolerances. The use of extruded seal bar halves 12a,12b results in a low cost method of forming the sealing surface profile in relation to machining of the seal bar halves and sealing surfaces. Providing a temperature controller 32 which maintains the operating temperature of the seal bar 10 at a fixed value with no operator accessible temperature adjustment eliminates glue seal interface failure problems due to excessive temperature settings and thereby prolongs the life and integrity of seal bar 10. It is to be understood, however, that the feature of providing fixed temperature settings is an optional feature and it is possible to practice this invention through the use of a controller providing some degree of temperature adjustment by the operator.

Seal bar 10 may be assembled for manufacture by first applying epoxy 35 along the opposing faces 14a,14b of seal bar halves 12a,12b including disposition of epoxy within the cavities 26,37,40 adapted to contain temperature sensor 24, heating element 26, and knife 20, respectively. The sensor 24, heating element 26, and knife 20 are then positioned within the respective cavities so that substantially entirely all their surfaces are in contact with the glue line. Epoxy 35 is also disposed between sensor 24 and heating element 16 if separate components are used. The seal bar halves 12a,12b are then brought together and clamped. The overall assembly is then subjected to heat (such as in an oven) to enable heat curing of the epoxy adhesive.

Alternatively, heat curing of epoxy 35 may occur by connecting heating element 16 to a power source to create internal heat within the seal bar assembly thus curing the epoxy.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A seal bar, comprising:
   (a) a pair of metal seal bar halves permanently adhered together along facing surfaces to form permanently adhered facing surfaces;
   (b) cutting knife means mounted to extend between said permanently adhered facing surfaces and project from said seal bar halves, a pair of sealing surfaces respectively formed on said seal bar halves and extending adjacent said cutting knife means;
   (c) heating element means mounted between said permanently adhered facing surfaces for heating said cutting knife means and said sealing surfaces through said metal seal bar halves; and
   (d) adhesive means disposed between said permanently adhered facing surfaces for permanently adhesively securing said metal seal bar halves and said cutting knife means and said heating element means together to form said seal bar.

2. The seal bar of claim 1, wherein said seal bar is of unitary construction.

3. The seal bar of claim 1, wherein said metal seal bar halves and said cutting knife means and said heating element means are permanently adhered together without screws.

4. The seal bar of claim 1, wherein said adhesive means has a melting temperature greater than the operating temperature range of said seal bar.

5. The seal bar of claim 4, wherein said melting temperature is approximately 450° F. and said seal bar operating temperature is approximately 325° F.

6. The seal bar of claim 1, further comprising temperature sensor means permanently adhered in said seal bar with said adhesive means for sensing temperature of said heating element means.

7. The seal bar of claim 6, wherein said temperature sensor means is connected to a temperature controller means which maintains said operating temperature of said seal bar at a fixed operating temperature which is below said melting temperature of said adhesive means.

8. The seal bar of claim 7, wherein said temperature controller means has a pre-set temperature value to prevent temperature adjustment by an operator.

9. The seal bar of claim 6, wherein said temperature sensor means and said heating element means are thin, elongate elements.

10. The seal bar of claim 1, wherein said adhesive means is an epoxy.

11. The seal bar of claim 1, wherein said metal seal bar halves are extruded metal members.

12. A seal bar, comprising:
 (a) plural metal bar members permanently adhered together to form a seal bar body, said plural metal bar members having exterior sealing surfaces;
 (b) heating element means mounted to at least one of said plural metal bar members for heating said sealing surfaces; and
 (c) adhesive means for permanently adhesively securing said plural metal bar members and said heating element means together.

13. The seal bar of claim 12, wherein said adhesive means is an epoxy.

14. The seal bar of claim 13, wherein said epoxy is a heat cured epoxy.

15. The seal bar of claim 12, wherein said plural mental bar members are extruded metal members.

16. The seal bar of claim 12, wherein a cutting knife means is permanently adhered between said plural metal bar members with said adhesive means to extend therefrom adjacent said sealing surfaces.

17. The seal bar of claim 15, wherein said plural metal bar members are extruded into a specific shape without machining.

18. The seal bar of claim 16, further comprising temperature sensor means permanently adhered in said seal bar with said adhesive means for sensing temperature of said heating element means.

19. The seal bar of claim 17, wherein said specific shape is circular in plan view.

20. The seal bar of claim 17, wherein said specific shape is U-shaped in plan view.

21. The seal bar of claim 17, wherein said specific shape includes a curved portion in plan view.

22. The seal bar of claim 15, wherein said plural metal bar members are manipulated into a specific shape without machining.

* * * * *